United States Patent [19]
Zankl

[11] 4,146,118
[45] Mar. 27, 1979

[54] BRAKE SHOE ASSEMBLY

[76] Inventor: Robert H. Zankl, 500 W. 84th St., Miami, Fla. 33014

[21] Appl. No.: 877,593

[22] Filed: Feb. 14, 1978

[51] Int. Cl.² ............................................. F16D 69/04
[52] U.S. Cl. .................................. 188/250 G; 85/37; 188/73.1
[58] Field of Search ................ 188/73.1, 73.2, 250 R, 188/250 G, 250 B; 85/37; 29/507, 509, 522

[56] References Cited

U.S. PATENT DOCUMENTS

| | | | |
|---|---|---|---|
| 2,096,598 | 10/1937 | Sheane | 85/37 |
| 3,349,871 | 10/1967 | Walther et al. | 188/250 B |
| 3,359,847 | 12/1967 | Richmond | 85/37 |
| 3,526,032 | 9/1970 | Pipher | 85/37 |
| 3,767,018 | 10/1973 | Gordon | 188/250 G |
| 3,840,980 | 10/1974 | Auriol | 85/37 |
| 4,088,053 | 5/1978 | Tyree | 85/37 |

*Primary Examiner*—Edward R. Kazenske
*Attorney, Agent, or Firm*—Ernest H. Schmidt

[57] ABSTRACT

A brake shoe assembly including a brake lining member and a backing plate or shoe have aligned rivet opening pairs for riveting together with the use of dead soft metal rivets having tapered shank portions the volumes of which are substantially equal to the combined volume of the openings through which they extend for riveting, the rivets also having tubular, cylindrical end or tip portions adapted to roll over the outside of the backing plate or shoe while the shank portions substantially completely fill their openings during setting of the rivets to provide for exceptional strength, both in shear and tension, of the assemblage.

5 Claims, 6 Drawing Figures

BRAKE SHOE ASSEMBLY

This invention relates to riveted brake assemblies, and is directed particularly to improvements in riveting attachment of brake linings to brake shoes in automotive brake assemblies.

Heretofore in the factory assembly of brake lining to metal brake shoes, whether of the drum or disc type, it has been common practice to use semi-tubular rivets applied through countersunk openings in the brake lining and secured in place by the use of a riveting machine operative to roll the shank end of the rivets against the underside of the shoe. Because of practical considerations in the mass production manufacture of brake linings and shoes, tolerances in the location of the rivet holes, though kept within reasonably small limits, nevertheless necessitated the use of rivets the shank diameters of which were substantially less than those of the rivet openings in order to provide for free passage of the rivets through even the most misaligned pairs of rivet openings in the assembly of the lining to the shoes. In order to roll the shank ends of such rivets for securement against the outside of the metal shoe the rivets had to be of such hardness as precluded any substantial lateral flow of the shank during riveting. Instead, the rivets had a tendency to buckle and bulge at one or more places along their tubular shanks, most often at an oblique angle, causing them to shift to one side and thereupon roll over unevenly at the tip ends during riveting. Also, there remained considerable lateral play in the aligned rivet holes, resulting in weakness in shear between the lining member and the brake shoe to which it was riveted as well as weakness in tension. The weakness in shear is especially detrimental in disc brake assemblies wherein, because of the interaction of the rotary disc with the flat disc brake assembly during braking, variable shear stresses are effected between the lining and shoe which, over a period of time have a tendency to loosen the lining beyond acceptable limits for safe braking. Moreover, in disc brake assemblies especially, the weak and oftentimes loose attachment of brake lining pad to the metal shoe member subjected the assemblage to further weakening and separation under the ordinary vibrational forces of highway driving. Another deficiency in the riveting of disc brake assemblies has been frequent weakening by fracture, crumbling or the like of the relatively brittle brake lining material under the rivet head when the rivets buckled unevenly during riveting as described above. In order to minimize such destruction of the lining under the heads of the rivets, the remaining lining thickness within the counter sunk openings through which the rivets were received for riveting below the braking surface, was made somewhat thicker than it need otherwise be, resulting in less usable lining thickness and consequent shortened braking life.

It is, accordingly, the principal object of this invention to improve riveting strength in the assembly of brake lining or brake bands to brake shoes, the assembly of clutch facing to clutch places, and the like, thereby overcoming the above described deficiencies heretofore encountered.

It is a more particular object to provide a novel and improved assembly of brake lining to brake shoes wherein the shank of the rivet is slightly tapered to terminate in a reduced diameter tubular portion adapted to be rolled over in the riveting process, the rivet being dead soft before riveting to provide for lateral spread to conform in engagement within the aligned brake lining and shoe openings through which the rivet extends. To provide for such close fitting spread of the rivet in the rivet opening, the volume of the tapered shank of the rivet is calculated to be substantially equal to the combined volume of the aligned openings through which the rivet extends, that is, the volume of the materials removed in providing the rivet openings, so that they will be substantially entirely replaced by the deformed rivet shank upon its being riveted in place.

Yet another object of the invention is to provide an automotive brake assembly of the character described wherein the rivet openings in the backing plate or shoe are back-tapered, that is, of increasing diameter from the inside to the outside of the rivet shank openings, to provide for interlocking expansion of the rivets upon assembly for further strengthening the bond of brake lining to brake shoe. This increased tensile strength greatly reduces uneven wearing of the lining due to differences in thermal expansion between the lining material and the metal backing plate or shoe. Looseness in tension would otherwise permit separation of the lining material from the shoe under the high temperatures encountered in braking, resulting in accelerated wearing away of the lining at high spots. This in turn would decrease braking efficiency at other temperatures, particularly when cold at the beginning of a braking operation.

Still another object of the invention is to provide a riveted automotive brake assembly of the character above described that will be economical to manufacture, easy to use in riveting operations, and which, in use, will be effective, dependable and durable in maintaining a strong attachment both in shear and in tension between brake bands and brake shoes.

Other objects, features and advantages of the invention will be apparent from the following description when read with reference to the accompanying drawings. In the drawings, wherein like reference numerals denote corresponding parts throughout the several views.

Figure 4:
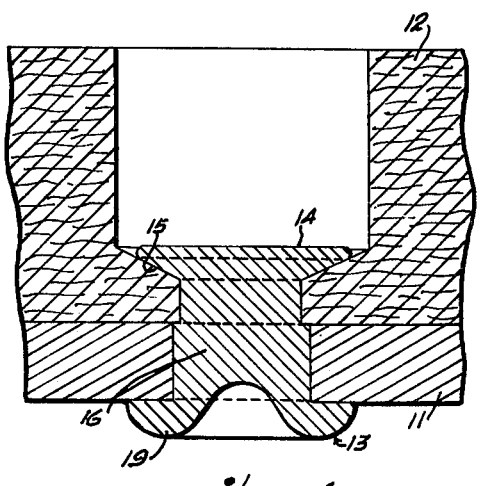
FIG. 4 is an elevational view of the rivet of FIG. 3 after being set, and illustrating in cross-section how the shank of the rivet spreads along its length to completely fill the lining and backing openings.
Figure 5:
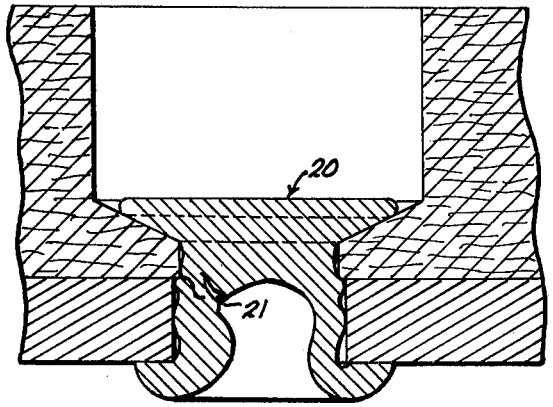
Figure 6:
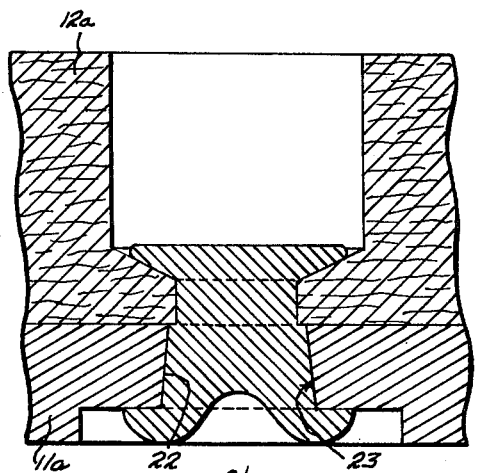

FIG. 5 is a modified form of assembly illustrated as in FIG. 4 but showing the brake shoe or backing plate rivet opening as being back-tapered to further improve interlocking securement of the brake asembly parts; and FIG. 6 is a cross-sectional view similar to that of FIGS. 4 and 5, but illustrating the riveting behavior of a typical rivet of the prior art in the assembly of brake linings to brake shoes.

Figure 1:
FIG. 1 illustrates a portion of a disc type brake shoe assembly, in side elevation and partially in cross-section.

Referring first to FIG. 1 of the drawings, reference numeral 10 designates a typical automotive brake shoe assembly, a disc brake shoe assembly, for example, having a metal support plate member or shoe 11 against the outside of which a brake lining member 12 is fixed by rivets 13 embodying the invention. Rivet 13, shown separately, in FIG. 2, comprises a rivet head portion 14, the underside of which may be slightly beveled or tapered as indicated at 15, integrally formed with a slightly tapered or frusto-conical shank portion 16 terminating in a comparatively short, cylindrical tip portion 17. The tip portion 17 as well as a portion of the shank 16 of the rivet is hollow, that is, formed with a coaxial cylindrical recess 18 (see FIG. 3) the depth of which is determined as is hereinafter more particularly described. A salient feature of the invention resides in the fact that the rivets are treated in their manufacture to be substantially dead soft, as compared with brake assembly bonding rivets heretofore used in the industry. Preferably, the rivets will be fabricated of steel, although other metals such as brass or aluminum could alternatively be used.

Figure 3:
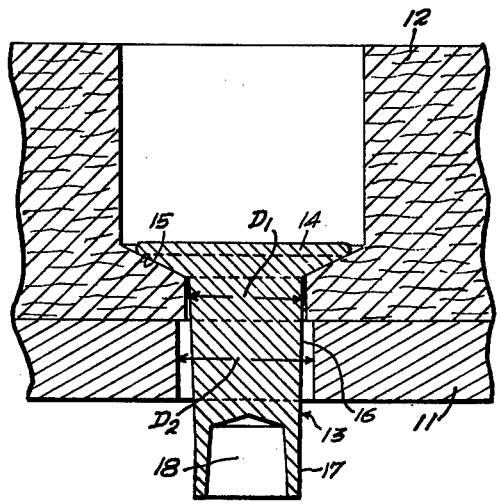
FIG. 3 illustrates, on an enlarged scale, a rivet embodying the invention inserted in aligned openings of a brake lining and backing plate or shoe prior to the setting of the rivet for securing the assembly together.

Referring to FIGS. 3 and 4 illustrating use of the rivet in bonding a brake lining member 12 to a brake plate or shoe 11, it will be seen that the diameter of the rivet shank opening $D_1$ in the lining member 12 will be slightly different, usually somewhat less than the diameter $D_2$ of the companion opening in the brake shoe 11, to accommodate for the slight misalignment normally occuring in mass production manufacturing processes. As illustrated in FIG. 4, the volume of the tapered shank, its softness, and the depth of the recess 18 are such that upon setting the rivet in place, the shank of the rivet cold flows to substantially entirely fill the rivet openings in both the brake lining member 12 and brake shoe 11, with the rolled over portion 19 being of such thickness and in such firm contact about the outside of the shoe as to afford great connecting strength in the assembly, both in shear and in tension. This is of especially great importance in disc brake assemblies since the rivets are not only stressed in various directions of shear during braking, but must also, as described above, withstand large differences in linear thermo-expansion of the brake lining material and the backing plate or shoe which impose tensile stress on the rivets.

Figure 2:
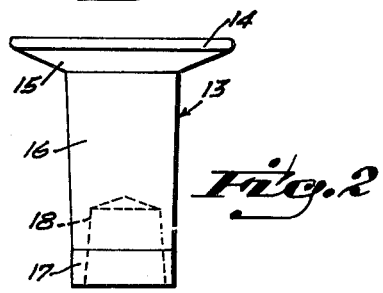
FIG. 2 is a side elevational view of a rivet embodying the invention, shown separately.

With further reference to FIGS. 2 and 3, in order to effect the close fitting attachment or bonding of the rivet in the brake assembly of FIG. 4 as described above, the volume of the shank 16 for a given brake assembly is calculated to be equal to the combined volume of the rivet hole openings in the brake lining member 12 and shoe 11 comprising the assembly.

As illustrated in FIG. 3 the depth of the cylindrical recess is such as to extend only slightly into the shoe 11 after riveting to provide for firm riveting while at the same time minimizing any loss of riveting strength. In this connection, it is also to be noted that since the recess or hollow in the tip extends into the tapered shank portion before riveting, it is buttressed at the bottom of the recess to insure smooth and even roll over without any tendency to buckling.

By way of comparison, FIG. 6 illustrates in cross-section a prior art rivet 20 of cold worked, tubular shank construction wherein no relationship exists between rivet shank volume and the volume of the rivet openings, and wherein compressional roll-over is relied on to clamp the parts together. Upon riveting, deformation of the shank end or tip will generally take place as illustrated, with the likelihood of a crack appearing in the rivet near the shear line, as indicated at 21. The reason for the probable appearance of the crack is that during riveting, although the tubular end portion of the rivet will begin to roll, because of the deep rivet hole it will buckle and after buckling the rivet will be crushed into the hole, only partially filling it.

FIG. 5 illustrates a modified form of riveted brake assembly embodying the invention which even further improves the riveting strength between the lining 12a and backing plate or shoe 11a. In this assemblage the rivet opening 22 in the shoe 11a is back-tapered, in fabrication of the rivet recess 23, whereby the rivet shank, upon its being set in place, will expand, due to its relative softness, to fill the void in interhooking relation. It will be readily apparent that this construction still further improves interconnection of the assemblage illustrated in FIG. 4, and is particularly useful in disc brake application. It will be understood that, as in the embodiment of the invention illustrated in FIGS. 3 and 4 as described above, the shank volume of the rivet 13a will be calculated to be substantially equivalent to the combined volumes of the cylindrical and frusco-conical rivet openings of the brake member 12a and brake shoe 11a, respectively. It is further to be understood that the working of rivets embodying the invention upon riveting or setting in place serves to harden them sufficiently to prevent cold flow and consequent loosening during braking operations.

An important advantage of the invention resides in the fact that in setting the rivets, a pressure pad can be used in holding the parts in riveting position so that the forces of riveting will all be contained between the hammer and anvil of the rivet setting machine. Thus, only a small force is placed again the fibrous brake lining material under the rivet head, thereby preventing the crushing which often occurs in the crush-setting of rivets heretofore used, as described above. This permits, in riveted assemblies embodying the invention, increasing the depth of the countersunk rivet openings in the brake lining material without danger of weakening the connecting bond, thereby providing for greater useful lining life in a lining of given thickness.

While I have illustrated and described herein only two forms in which my invention can conveniently be embodied in practice, it is to understood that these forms are given by way of example only and not in a limiting sense. The invention, in brief, comprises all the embodiments and modifications coming within the scope and spirit of the following claims.

What I claim as new and desire to secure by Letters Patent is:

1. A brake shoe assembly comprising, in combination, a brake lining member, a metal brake shoe member in face-to-face relative engagement with respect to said brake lining member, a plurality of pairs of substantially aligned openings in said brake lining member and said brake shoe member for the reception of rivets for riveting said brake lining member to said brake shoe member, said rivets being of substantially dead soft metal before rivet setting and each comprising a rivet head portion integrally formed with a convergently tapering frusto-conical shank portion, said frusto-conical shank portion terminating in a cylindrical tubular tip portion, said tubular tip portion being defined by an axial recess the inner end of which extends somewhat beyond the plane of juncture of said tip portion and said frusto-conical shank portion, the maximum diameter of said frusto-conical shank portion, before rivet setting, being less than the diameter of said pair of aligned rivet openings and the volume of said frusto-conical shank portion being substantially equal to the combined volumes defined by said pair of aligned rivet openings whereby, upon setting said rivet in place, said frusto-conical shank portion will expand laterally to substantially completely fill the associated pair of aligned rivet openings and said tip portion will be rolled over in clamping engagement about the outside of the brake shoe member rivet opening.

2. A brake shoe assembly as defined in claim 1 wherein the openings in said brake shoe member are back-tapered to be of increasing diameter from the inside to the outsides thereof.

3. A brake shoe assembly as defined in claim 1 wherein said brake lining member and said brake shoe member are flat for use in disc brake assemblies.

4. A brake shoe assembly as defined in claim 3 wherein said rivets are of soft steel.

5. A brake shoe assembly as defined in claim 1 wherein said rivets are of soft steel.

* * * * *